United States Patent [19]
Wagner

[11] 3,991,439
[45] Nov. 16, 1976

[54] MEAT TENDERIZER APPARATUS

[75] Inventor: Richard C. Wagner, Frankfort, Ill.

[73] Assignee: Hollymatic Corporation, Park Forest, Ill.

[22] Filed: Feb. 7, 1975

[21] Appl. No.: 547,983

[52] U.S. Cl. .................................................. 17/25
[51] Int. Cl.² ........................................... A22C 9/00
[58] Field of Search ..................... 17/25, 28; 99/533

[56] References Cited
UNITED STATES PATENTS

| | | | |
|---|---|---|---|
| 3,256,801 | 6/1966 | Greenspan | 17/25 |
| 3,521,321 | 7/1970 | Allinquant | 17/25 |
| 3,535,734 | 10/1970 | Ross | 17/25 |
| 3,736,583 | 5/1973 | Smith et al. | 17/25 |
| 3,744,089 | 7/1973 | Fetzer et al. | 17/25 |
| 3,842,464 | 10/1974 | McCord | 17/25 |

FOREIGN PATENTS OR APPLICATIONS

| 755,599 | 11/1933 | France | 17/25 |
|---|---|---|---|

*Primary Examiner*—Louis G. Mancene
*Assistant Examiner*—James D. Hamilton
*Attorney, Agent, or Firm*—Wegner, Stellman, McCord, Wiles & Wood

[57] ABSTRACT

A yieldable knife meat tenderizing apparatus that includes a plurality of force yieldable elongated knives with each knife having a sharp meat penetrating and meat severing end and force yieldable friction members holding the knives in meat penetrating position but with the knives being independently slidably yieldable relative to the friction members upon striking an obstruction such as a bone and meat retainers through which the blades extend and which engage the meat when the knives are in meat penetrating position to hold the meat against substantial movement with the knives upon withdrawal of the knives from the meat and a tiltable lacking device for tilting and locking onto a guide member when the retainer is in engagement with the meat.

4 Claims, 10 Drawing Figures

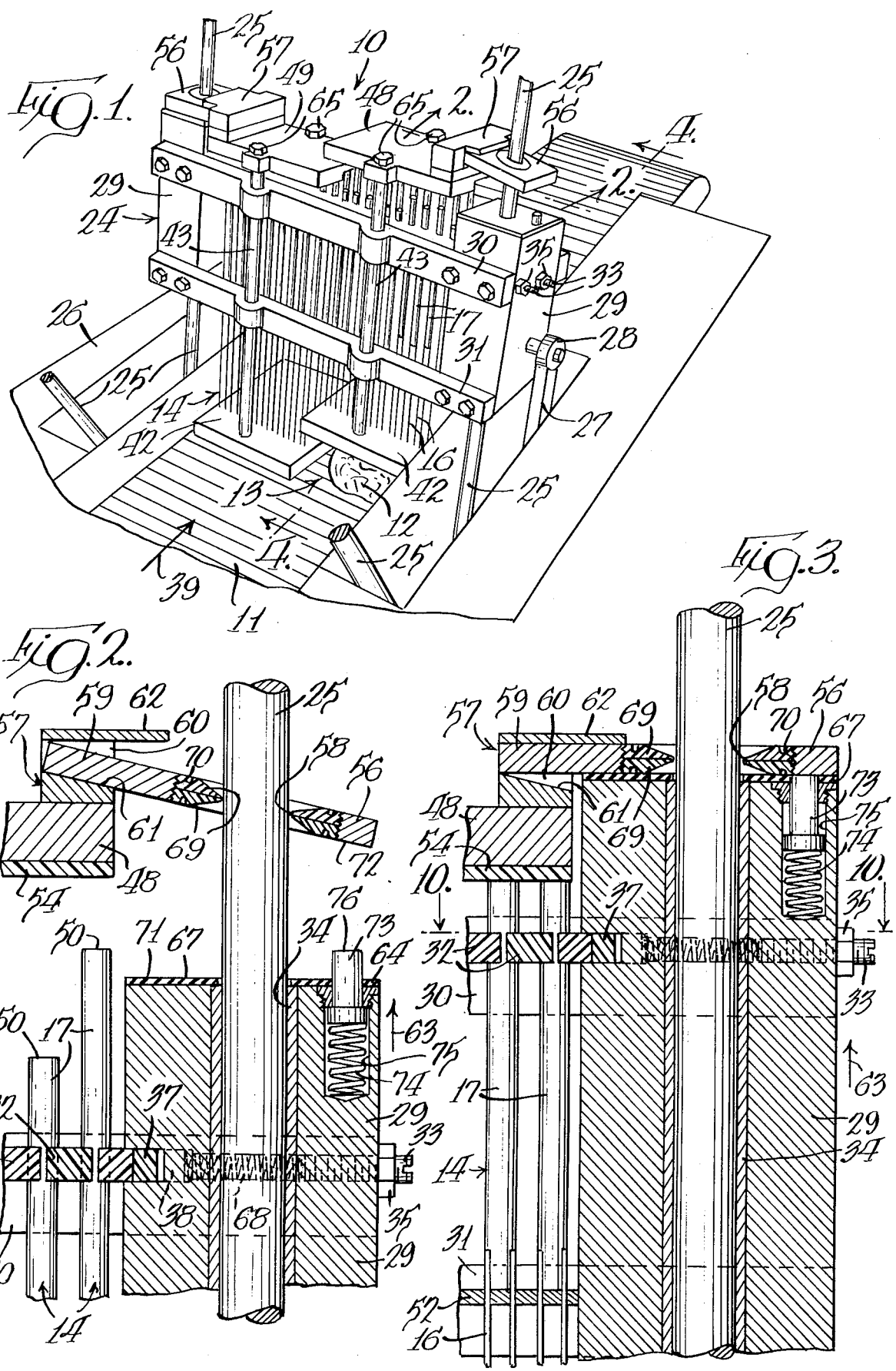

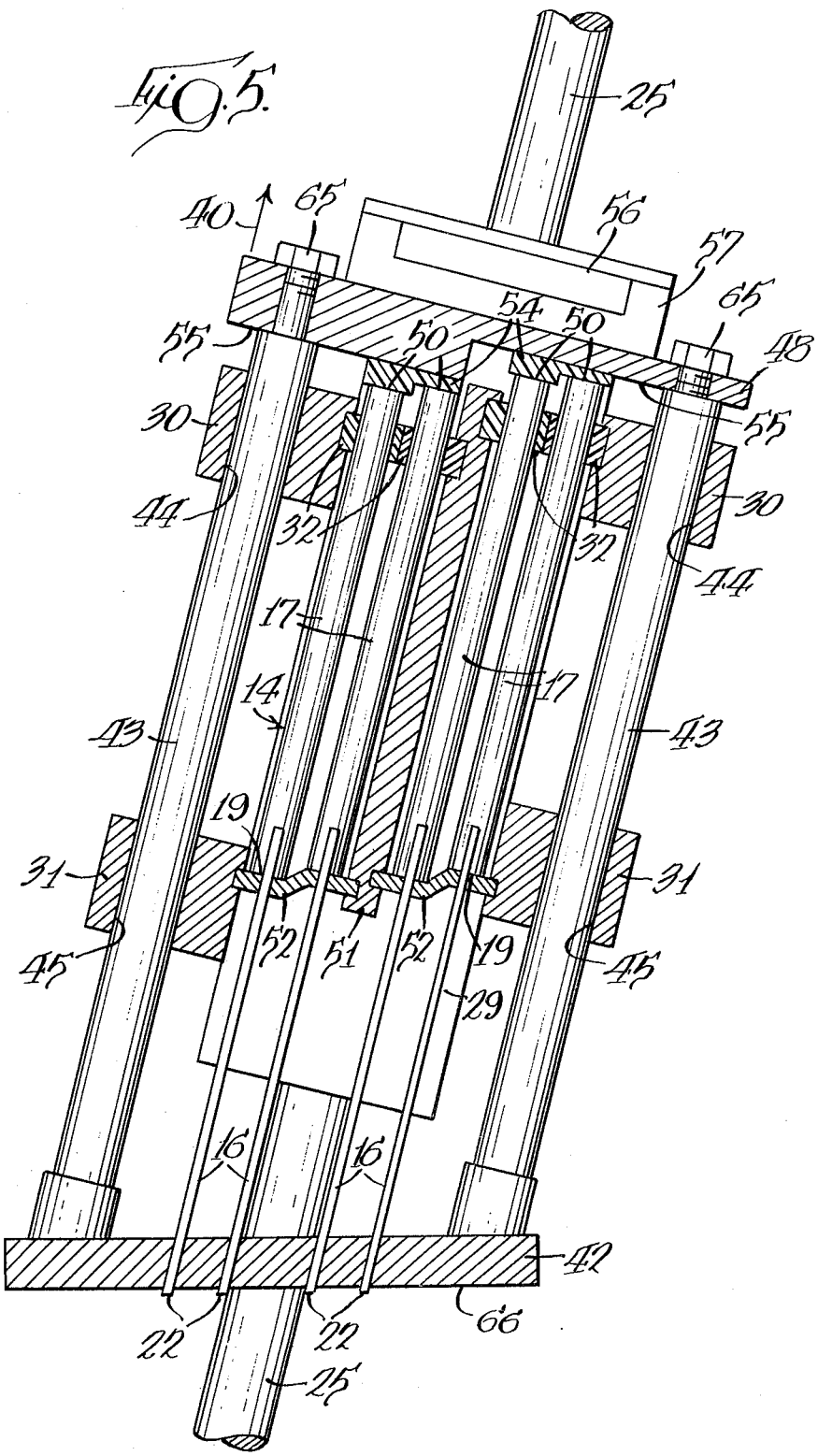

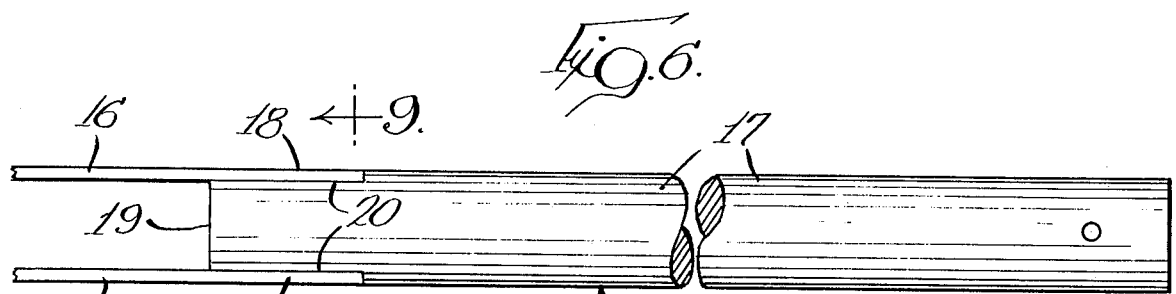
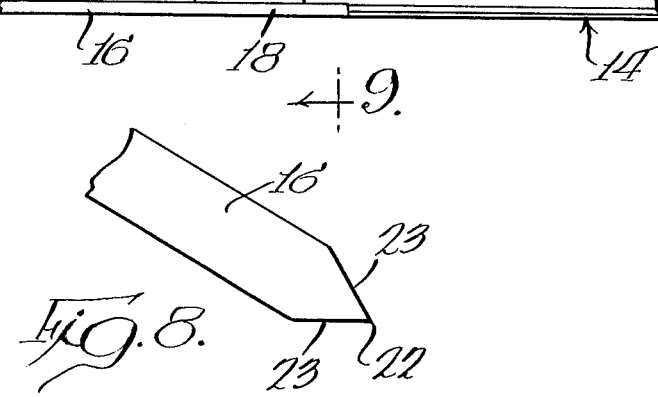
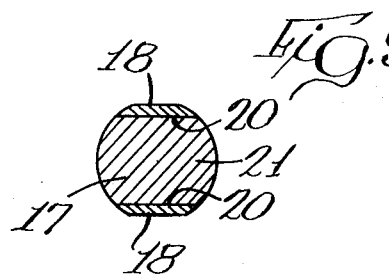
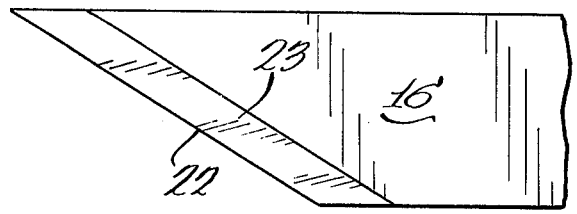
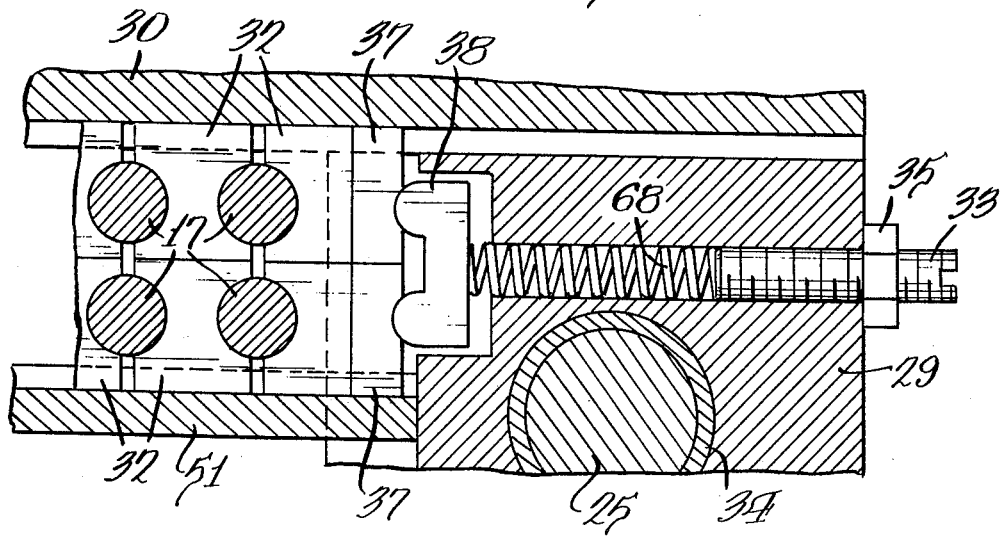

MEAT TENDERIZER APPARATUS

BACKGROUND OF THE INVENTION

This invention relates to a force yieldable knife means meat tenderizing apparatus in which force yieldable means are provided comprising friction members engaging each set of knife means for retaining the knife means independently in meat penetrating position.

The invention also relates to a meat tenderizing apparatus including a retainer movable with the knives when they are projected into the meat but held by an improved latch structure against the meat while the knives are withdrawn substantially to prevent the meat being lifted excessively by the retracting knives.

The invention also relates to an apparatus for tenderizing meat in which the meat is conveyed through a tenderizing zone by a conveyor and in which separate meat retainers are provided spanning the conveyor at the zone so that each retainer is independently operable to adjust for meat of varying thicknesses or for parallel lines of meat on the conveyor traveling through the tenderizing zone.

The knife structure used in the apparatus of this invention includes a piston of uniform cross sectional area on which either a single elongated knife is attached as described in U.S. Pat. No. 3,535,734 or preferably a plurality of knives for reasons described in U.S. Pat. No. 3,842,464 which is assigned to the same assignee as the present application. In each the piston and its knife or knives have essentially parallel axes.

Many prior patents disclose locking means for holding a meat retainer on the meat while the knives are withdrawn and with the locking means comprising a tiltable ring or similar structure that binds against a guide post during withdrawal of the meat but that is engaged by the knife structure on its retraction movement for leveling the structure and thus moving it to unlocked position and also for retracting the retainer with the retraction movement of the knives. One such patent is U.S. Pat. No. 3,521,321.

BRIEF DESCRIPTION OF THE DRAWINGS

FIG. 1 is a fragmentary perspective view of an apparatus for tenderizing meat embodying the invention.

FIG. 2 is a fragmentary sectional view taken substantially along line 2—2 of FIG. 1 and showing the locking device in locked position for holding a retainer against the meat during withdrawal of the knives.

FIG. 3 is a view similar to FIG. 2 but illustrating each locking device after it has been moved entirely to release position.

FIG. 5 is a view similar to FIG. 4 but illustrating the structure during withdrawal of the knives from the meat.

FIG. 6 is a shortened side elevational view of one set of knives.

FIGS. 7 and 8 are side elevational views taken at 90° to each other and illustrating the shape of the penetrating edge of each of the knives.

FIG. 9 is a sectional view taken substantially along line 9—9 of FIG. 6.

FIG. 10 is a fragmentary plan view taken substantially along line 10—10 of FIG. 3.

DESCRIPTION OF THE PREFERRED EMBODIMENT

Figure 4:
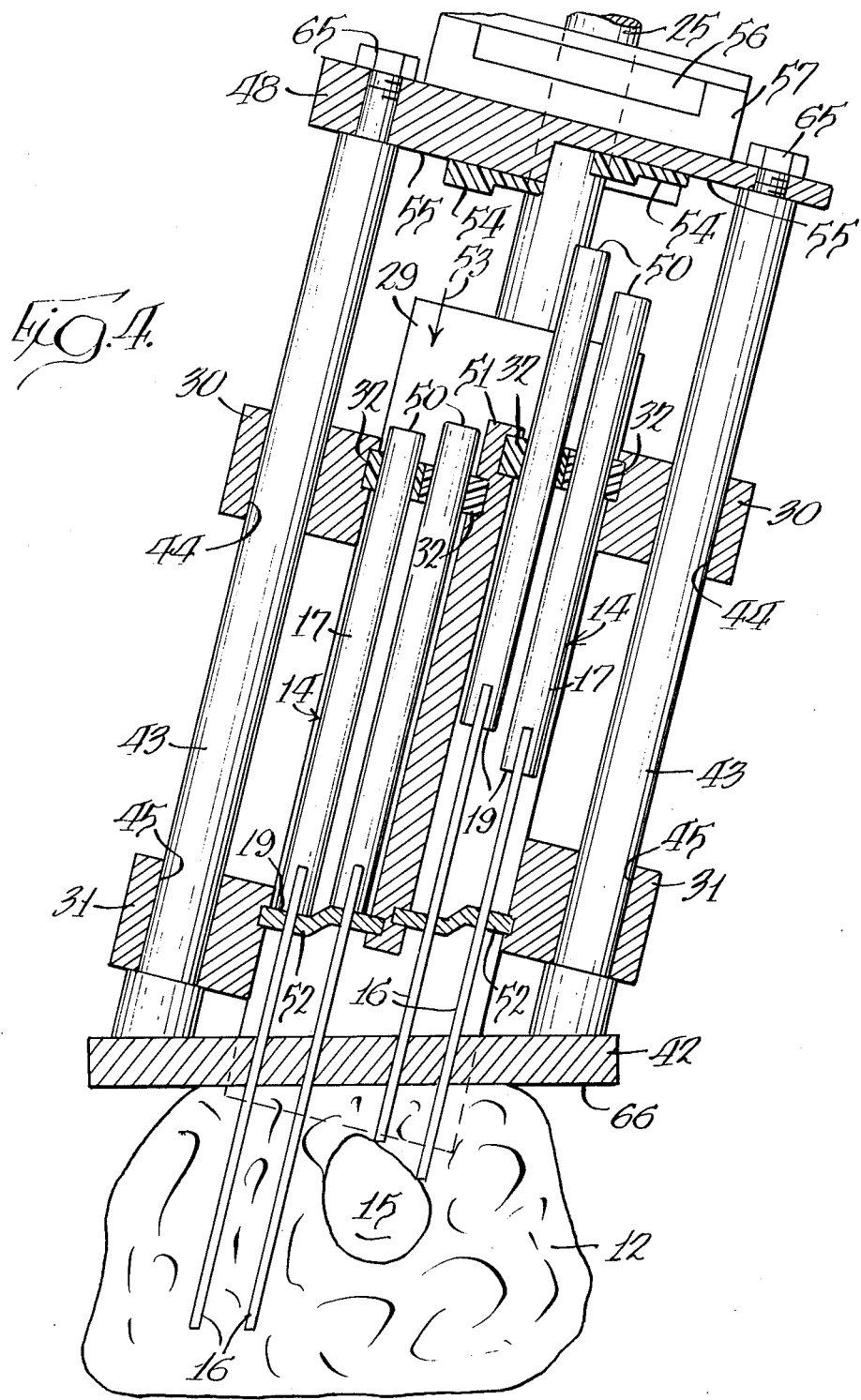
FIG. 4 is a fragmentary vertical sectional view taken substantially along line 4—4 of FIG. 1 and with the knives in meat penetrating position.

In the embodiment illustrated in the accompanying drawings the meat tenderizing apparatus 10 comprises a conveyor 11 for conveying meat illustrated schematically at 12 through a meat tenderizing zone 13 which is located beneath the meat tenderizing sets of knives 14. The tenderizing apparatus illustrated in the embodiment of the drawings is particularly adapted for tenderizing meat that contains obstructions such as bones 15 as the sets of knives are individually yieldable on striking a bone as illustrated in FIG. 4 so as to prevent damage to the thin individual knives 16. As is illustrated in FIGS. 6–9 each set 14 comprises a generally cylindrical elongated piston 17 on the bottom end of which is located a pair of knives 16. Each knife 16 is long, narrow and thin and each has an end 18 attached to a projecting end of a piston 17 and located on opposite sides of the piston and with each of the knife ends 18 being located in a peripheral recess 20 so that the knives are within the circumference 21 of its piston 17.

The flat individual knife 16 has a cutting edge 22 formed by opposite tapered surfaces 23 that join to form the sloped cutting edge 22 as illustrated in FIG. 8.

In the illustrated embodiment there are two knife operating heads 24 of which only 1 is illustrated in FIG. 1 for clarity of illustration. However, the two heads are arranged at an angle to each other and to the conveyor 11 in a manner similar to those shown in U.S. Pat. No. 3,736,623 also assigned to the same assignee as the present application.

Each head 24 is mounted for generally vertical reciprocation on a pair of spaced fixed parallel guide rods 25 that are mounted on a cabinet 26 which also carries the conveyor 11. There are thus two pairs of the guide rods 25 as illustrated in FIG. 1 with each pair being parallel to each other and with each pair carrying a knife operating head 24 for generally vertical reciprocation toward and away from the conveyor 11 and meat 12 transported thereon through the meat tenderizing zone 13.

The conveyor 11 may be intermittently moved 39 by any drive desired. Furthermore, the knife operating head 24 may be reciprocated on the parallel guide rods 25 by any desired drive structure. The conveyor drive and knife drive may be as illustrated in the above U.S. Pat. No. 3,736,623. The knife drive includes opposite drive rods 27 hingedly 28 connected to the vertically elongated slide blocks 29. These slide blocks comprise the sides of the knife operating head 24 and each slidably engages a guide rod 25 which extends therethrough. Extending between each pair of slide blocks 29 are pairs of upper 30 and lower 31 guide strips that are horizontal and parallel to each other.

Each set 14 of knives is retained independently in meat penetrating position by force yieldable means engaging the pistons 17 and comprising friction members 32 engaging the pistons 17 between them as illustrated in FIGS. 2–5 and 10. As is shown most clearly in FIG. 10 a pair of end bearings pieces 37 are provided on each end of each knife operating head 24 of which only one is shown in FIG. 1 to apply compressive force to the friction members or blocks 32 and thereby to the pistons 17 to provide the yieldable force that holds the knives 16 in extended meat penetrating position. Each bearing piece 37 is engaged by the opposite ends of a bearing block 38 which in turn is engaged by a compression spring 68 within a slide block 29 and the spring is held under the desired compression by the force adjusting bolts 33 each of which is locked in position by a lock nut 35.

In order to hold the meat 12 down when the knives are withdrawn as indicated by the direction arrow 40 (FIG. 5) there are provided meat retaining means comprising a plurality of retainers 42 (here shown as two) that span the width of the conveyor 11 at the meat tenderizing zone 13. Each retainer 42 is mounted on the bottoms of a pair of parallel rods 43 on each of the opposite sides of the knife operating head 24 with these rods being guided for generally vertical movement by engaging openings 44 and 45 in the horizontal guide strips 30 and 31, respectively. These rods are arranged in two pairs in the illustrated embodiment with each pair having mounted on their lower ends a meat retaining plate 42.

The upper ends of the pairs of rods 43 above the upper pair of guide strips 30 carry similar plates 48 and 49. These plates 48 and 49 serve as reset plates that are engaged by the upper ends 50 of the pistons 17 of the sets of knives in order to realign the cutting edges 22 of the knives at the completion of the retraction stroke 40 as is illustrated in FIG. 5.

The adjustable friction blocks 32 which are arranged in linear sets transverse to the conveyor 11 are positioned between the upper pair of guide strips 30 and on opposite ends of the divider plate 51 as shown in FIGS. 4, 5 and 10. As can be seen particularly in FIGS. 4 and 5 there are four rows of these friction blocks 32 in this embodiment with each row providing frictional resistance to movement of a similarly linearly aligned transverse row of knife pistons 17. The result is that not only is the yieldable force on the knife sets 14 adjustable but because of the narrow width of the friction blocks 32, the small diameters of the pistons 17 and other related factors the density of the knives or the number of knives 16 per unit area of the meat surface penetrated by the knives can be quite large. This is particularly true where the preferred structure of a plurality of knives 16 per piston 17 is employed such as the two knives per piston in the illustrated embodiment.

The lower pair of guide strips 31 which are arranged on opposite sides of the bottom of the vertical divider plate 51 carry elongated flat blade 16 guides 52. As is shown in FIGS. 4 and 5 the bottom ends 19 of the pistons 17 of the sets of knives normally bear against the upper surfaces of the blade guide strips 52 with the knives themselves 16 extending therethrough. However, when one or more knives strike an obstruction such as a bone 15 (FIG. 4) the downward movement illustrated by the arrow 53 in FIG. 4 stops so that the friction blocks 32 slide downwardly relative to the stopped pistons 17 thereby to prevent damage to the knives 16 that engage the obstruction.

When the knife operating head 24 are moved upwardly as indicated at 40 the upper ends 50 of the knives engage the resilient bumper strips 54 on the bottom stepped surfaces 55 of the upper reset plates 48 and 49. This causes the cutting edges 22 of all of the knives to be substantially horizontally aligned beneath the meat retaining plates 42 (FIG. 5) ready for the next meat penetrating stroke 53.

In order to hold the retainer plates 42 against the meat 12 while the knives 16 are being withdrawn 40 so that the meat will not be carried with the ascending knives there are provided means for locking the retainers 42 in the meat engaging position during this withdrawal of the knives from the meat. This means for locking comprises a tiltable locking device 56 in the form of a plate extending laterally from a bracket 57 mounted on the outside end of each reset plate 48 and 49.

Each locking plate 56 has extending through it a guide rod 25 as shown in FIGS. 1, 2 and 3. Surrounding each rod 25 is a pair of annular insert collars 69 that have flat contacting surfaces as shown in FIGS. 2 and 3 and a tapered inner edge that together define an opening 58 of very small height because of the thinness of the inner circumferential edges. These collars 69 that may be made of solid polyvinyl chloride are screw threaded into an opening 70 in each locking plate 56 with the threads being in opposite directions so that the two collars in each plate can be tightly screwed together. Thus each collar acts as a lock nut for the other.

The result of this structure is that when each knife operating head 24 has been lowered to meat penetrating position with the meat retaining plates 42 in lowered meat contacting position the withdrawing of the top 71 of each block 29 from beneath the bottom 72 of each locking plate 56 permits the plate to tilt by gravity (FIG. 2) and lock the meat retaining plates 42 against the meat. Then when the knives 16 are withdrawn from the meat by raising the slide blocks 29 in the direction 40 (FIG. 5) the tops 71 of the blocks 29 again move toward engagement with the bottom 72 of the lock plates 56 with the intention being to level the plates to the position shown in FIG. 3 wherein the whole structure including the meat retaining plates can move upwardly with the rising slide blocks 29 of the knife operating head 24.

In order to provide a smooth non-chattering action of these locking plates 56 in their movements relative to the stationary guide rods 25 there are provided vertically movable cylindrically shaped plungers 73 on each block 29 adjacent to a guide rod 25. Each cylindrical plunger is urged upwardly when free of restraint (FIG. 2) to above the top surface 71 of its slide block 29 by a compression spring 74 located in a well 75 in the top of its block 29. The plunger 73 also retracts into this well (FIG. 3). The purpose of this plunger 73 and spring 74 combination is to start the leveling of each locking plate 56 when the upper end 76 of a plunger contacts the bottom surface 72 on upward movement 73 of the knife operating head 24. The final leveling of each plate 56 to the fully released position of FIG. 3 is accomplished of course when the top surface 71 of each block 29 fully engages the bottom surface 72 of its locking plate 56 in the manner illustrated in FIG. 3.

Each locking plate 56 has an inner end 59 resting within a recess 60 at the top of the bracket 57. This recess as is shown in FIGS. 2 and 3 is defined by a downwardly and outwardly sloped top surface 61 on the bracket 57 and an overlying horizontal cover plate 62. When the locking plate 56 is in raised position (FIG. 3) where it is horizontally against the bottom surface of the cover plate 62 the plate insert collar opening 58 which is larger than the circumference of the guide rod 25 permits the locking plate 56 to slide easily relative to the guide rod 25. When this structure the locking plates 56 are held without using hinge pins or other connectors for arcuate rocking movement between the extreme jamming-locking position of FIG. 2 and the horizontal release position of FIG. 3 merely by the movement of the plates 56 within their angular recesses 60.

The operation of the tenderizing apparatus as illustrated in the embodiment of the accompanying drawings is as follows:

The knife operating heads 24 of which only one is illustraed in the drawings are reciprocated on their parallel guide rods 25 by the customary drive including the drive connecting rods 27 at the opposite ends of the head 24. This reciprocation in a downward direction applies a yieldable force to the sets of knives by the engagement of the pistons 17 of the knife sets with the friction blocks 32 whose friction force is easily regulated by the bolts 33 as described above. This friction force is sufficient to drive the knives 16 into the meat as illustrated in FIG. 4. However, when any of the thin knives 16 strikes an obstruction such as the bone 15 of FIG. 4 this particular knife or knives 16 stop so that the pistons 17 are held stationary while their friction blocks 32 slide downwardly on the outer surfaces of the pistons.

The downward movement of the knife operating heads 24 presses the meat retaining plates 42 against the meat and because of the plurality of transversely adjacent plates 42 the hold-down structure is adjustable to meats of varying thicknesses and even to operating with side-by-side rows of meat such as a double row of meat of the size of the single example 12 in FIG. 1. When the operating head 24 has reached the lowermost position as shown in FIG. 1 the locking plates 56 will have gravity tilted in the manner previously described to the position shown in FIG. 2 to lock the plastic inserts 69 and thereby the plate 56 to the respective guide rod 25. Then when the knife operating head starts its upward motion 63 by operation of the drive rods 27 the plates 42 will be retained against the meat while the knives 16 are withdrawn therefrom as previously described.

As each top surface 71 of the slide blocks 29 approach the bottom surface 72 of the respective locking plates 56 the top end 76 of the plunger 73 first contacts the bottom surface 72 of the plate 56 so that the yieldable spring 74 force begins the plate 56 leveling action with the resulting unlocking of the hold-down from the guide rods 25. Then continued movement of the head 24 in the upward direction 63 causes the top surfaces 71 to contact the bottom surfaces 72 of the plates 56 and complete the leveling by pressing the plates 56 against the cover plates 62 as shown in FIG. 3.

The friction blocks 32 which provide the yieldable knife retaining force on the pistons 17 may be of any material desired, preferably a plastic which may be nylon, Delrin, Rulon and the like. Delrin is a solid acetal homopolymer while Rulon is a reinforced Teflon with copper being a customary reinforcing agent incorporated in the Teflon.

As can be seen in FIGS. 6 and 9, the knives 16 have their upper ends 18 attached to the lower end 19 of each piston 17. Each knife end 18 is located within peripheral recesses 20 so as to be completely within the periphery or circumference 21 of a piston. This provides a very convenient structure for quickly replacing a knife set 14 as when a knife is broken or otherwise damaged. In those instances it is only necessary to remove the corresponding reset plate 48 or 49 by removing the corresponding pair of nuts 65 and then the particular reset plate 48 or 49 and the attached bumper strips 54. It is then only necessary to lift the knife set 14 including the knives 16 and pistons 17 upwardly to remove it from the apparatus and then reinsert another knife set 14 and reattach the particular reset plate.

The yieldable meat tenderizing apparatus of this invention not only protects the individual slender knives from damage when they strike an obstruction such as a bone but also provides a readily adjustable yieldable pressure for each knife which is easily regulated and easily varied.

Another very important advantage to the invention is the locking arrangement embodied in the locking plates 56 for retaining the plates 42 independently against the meat 12 while the knives 16 are being withdrawn so that the meat will not be lifted upward during the withdrawing of the knives.

Because a simple locking plate 56 is used on each end of the reciprocable head no spring force is applied to the meat as was customary with previous meat tenderizers. In the present invention the gravity effect on the plates 56 move them automatically down to locking and jamming position as illustrated in FIGS. 1 and 2. Then when the knives 14 are withdrawn by moving upwardly the entire head assembly 24 as indicated by the arrow 63 the friction of the knives 16 within the meat 12 as illustrated in FIG. 4 would tend to lift the meat 12 up with it. However, this is prevented by the angled jamming of the locking plates 56 on their stationary guide rods 25.

The use of the simple locking plates 56 as described in place of the customary hold-down tension springs pressing on the meat has very important advantages in and of itself because now the number of knives that can be installed as limitless within the space available while previously the number of knives was limited. The reason for this is that increasing the number of knives increases the upward withdrawal force necessary to pull the knives from the meat. This increasing force necessary to withdraw the knives required a correspondingly heavy spring load to hold the stripper plates 42 against the meat to counteract the increased force on the knives. This heavier spring load often resulted in an excessive force on the meat that was contacted by the strippers thereby causing distortion and sometimes damage to the meat. This new hold-down or stripper mechanism of this invention employs a minimum force on the meat which in practice is about equal to the withdrawal force exerted on the knives 16.

Because of the simplicity and compactness of the structure of this invention it is now simple to use a plurality of stripper plates as illustrated at 42 linearly aligned across the width of the conveyor 11. Thus in the embodiment disclosed in FIG. 1 there are two of these plates so that each covers approximately one-half of the width of the conveyor. This not only accommodates meat of different thickness across the width of the conveyor but also permits running two lines of meat side-by-side through the tenderizer with each line of meat being of different thicknesses. The stripper plates 42 are preferably made of a synthetic plastic such as solid acrylonitrile-butadiene-styrene copolymer commonly known as ABS.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. Apparatus for tenderizing meat, comprising: a plurality of knives each with a cutting edge end; a support for the knives on which said knives are mounted for reciprocation between meat penetrating position and retracted position; conveyor means for conveying meat to be tenderized beneath said knives through a meat tenderizing zone; meat retaining means at said zone comprising a plurality of meat retainers; means for positioning said retainers in transverse alignment across the width of said conveyor at said zone; means for reciprocating said retainers to and from meat engaging position; means for independently locking each said retainer in its meat engaging position during withdrawal of corresponding said knives from the meat; and means for independently releasing each said retainer when said knives are substantially completely withdrawn from the meat.

2. The apparatus of claim 1 wherein means are provided for mounting each said retainer on said knife support for reciprocation with said support for movement relative to said support, said plurality of retainers spanning substantially the full width of said zone across said conveyor.

3. Apparatus for tenderizing meat, comprising: a plurality of sets of knives each comprising a knife blade with a cutting edge end; a support for said sets of knives for reciprocation between meat penetrating position and retracted position; means for reciprocating said support and thereby the sets of knives therein; a meat retainer through which said knives extend and reciprocable with said sets of knives to and from meat engaging position; means for locking said retainer in said meat engaging position during withdrawal of said sets of knives from the meat comprising a guide member on which said reciprocable meat retainer is mounted for reciprocation and a tiltable locking device loosely mounted on said retainer and engaging said guide member; means for permitting tilting of said locking device into locking relationship with said guide member when the meat retainer is in engagement with said meat; and means on said support for moving said locking device to release position upon engagement thereof by said support, said guide member comprising a fixed element on which said support is reciprocably mounted and said locking device comprises a plate having an opening loosely embracing said element; and means for loosely retaining an end of said plate on said support for arcuate movement relative to said support.

4. A yieldable knife meat tenderizing apparatus particularly for meat that contains bones, comprising: a plurality of force yieldable sets of elongated knives with each set comprising a knife with a sharp meat penetrating and meat tissue severing end and a piston on which said knife is mounted; force yieldable means independently retaining each said set of knives in meat penetrating position, said force yieldable means predominantly comprising friction members engaging said pistons each of which is independently slidable relative to a friction member when a corresponding knife strikes an obstruction; means for reciprocating said sets of knives toward and from said meat into and out of meat penetrating position; means for returning said sets of knives to said meat penetrating position upon said reciprocating from said meat; a reciprocable frame on which said sets of knives are mounted; a guide through which said knives extend; and a bumper member located substantially at the upper limit of said reciprocation engaged by said pistons for returning any force yielded knife set to its said meat penetrating position on reciprocation movement of said sets of knives to said upper limit.

* * * * *